Patented Oct. 11, 1949

2,484,415

UNITED STATES PATENT OFFICE 2,484,415

MANUFACTURE OF POLYVINYL DICARBOXYLIC ACID ESTERS

Carl J. Malm and La Moyne D. Bearden, Rochester, N. Y., assignors to Eastman Kodak Company, Rochester, N. Y., a corporation of New Jersey No Drawing. Application August 10, 1945, Serial No. 610,196

3 Claims. (Cl. 260—78.4)

This invention relates to the preparation of polyvinyl dicarboxylic acid esters, in which dilution is desirable before the precipitation step in which trisodium phosphate is added, thus enabling dilution with water.

The dicarboxylic acid ester of high polymer polyhydroxy compounds are ordinarily prepared by treating either the polyhydroxy compound or an ester or ether thereof, having free and esterifiable hydroxyl groups with a dicarboxylic acid anhydride under esterifying conditions. This esterification may be accomplished by the use of a tertiary organic base with or without a solvent. On the other hand, the ester may be prepared by using a solvent without the base, employing an elevated temperature and an ester of the polyhydroxy compound as the starting material.

In those prior processes either the pyridine, the solvent, or their mixture were employed in large or excessive amount, as compared to that necessary to promote the reaction, as otherwise it was necessary to dilute the reaction mass prior to precipitation with an organic solvent in order to obtain a finely divided readily worked precipitate, and to assure the success of the separation step. In either case, the cost of the process was relatively great because of the large proportion of solvent or pyridine employed.

In the making of polyvinyl dicarboxylic acid esters, it is desirable to employ a minimum of solvent or pyridine or both, thus making for economy and also increasing the concentration of anhydride in the esterification mixture. This employment of a minimum of liquid in the reaction mass necessitates dilution of that mass prior to its precipitation. This may be done with an organic solvent but the economy achieved by restricting the use of solvent in the esterification is cancelled by this further use of solvent. As the use of solvent with the pyridine or a restricted amount of pyridine results in an ester which is insoluble in water, water dilution would result in precipitation of the ester. We have found that by adding trisodium phosphate to the completed reaction mass, the ester may be rendered soluble in water, and the mass may then be diluted with water to a thin consistency, thereby facilitating the precipitation of the ester.

Our invention is directed both to processes of preparing polyvinyl dicarboxylic acid esters in which a restricted proportion of pyridine is employed, and those in which pyridine is omitted entirely. For example, it has been found that in the manufacture of polyvinyl dicarboxylic acid esters, such as polyvinyl phthalate and polyvinyl acetate phthalate the amount of pyridine employed may be less than that which would combine with all of the carboxyl groups in the reaction mixture, providing a suitable auxiliary solvent is used and the reaction proceeds satisfactorily. In some processes of making polyvinyl dicarboxylic acid esters the pyridine is omitted entirely. In those processes in accordance with our invention, the completed reaction mass is diluted with an aqueous solution of trisodium phosphate, and the product can then be separated from the mass by precipitating in dilute acid.

In some processes of making polyvinyl dicarboxylic acid esters, polyvinyl alcohol is reacted with the anhydride of the dicarboxylic acid in an organic solvent containing small proportions of water using an elevated temperature. The products resulting from processes of that type are insoluble in water but soluble in organic solvents, and heretofore either the amount of solvent employed in the esterification made dilution unnecessary before precipitation or an organic solvent was added to the completed reaction mass to facilitate that operation. In accordance with our invention, the completed reaction mass is diluted with an aqueous solution of trisodium phosphate to impart to the mass a suitably low viscosity for precipitation.

After dilution of a completed reaction mass in accordance with our invention, precipitation is carried out by pouring the mass with agitation into water containing a small proportion of mineral acid, such as an aqueous solution of hydrochloric, sulfuric, or phosphoric acid of 5 per cent effective concentration.

In its broadest aspects our invention comprises adding trisodium phosphate to the completed reaction mixture in an amount sufficient to neutralize all of the free carboxyls therein. This applies to processes for making polyvinyl phthalate, polyvinyl acetate phthalate, polyvinyl succinate, or in general, acid dicarboxylic acid esters. We have found that a 10 per cent solution of trisodium phosphate in water is quite satisfactory for imparting water solubility to the ester without hydrolyzing it or causing excessive foaming as might be caused by the use of sodium hydroxide or sodium carbonate. After the addition of the trisodium phosphate to the completed reaction mixture, water as a diluent may be added until the mass has the desired viscosity. Obviously when a high viscosity ester is prepared, more dilution would be desirable than with a low viscosity ester. The following examples illustrate our invention:

Example I 450 grams of phthalic anhydride was mixed with 480 grams of methyl ethyl ketone and 270 grams of pyridine for one hour at approximately 130° F. 150 grams of polyvinyl alcohol was added and the reaction was carried out at 220° F. for five hours. The mass was then cooled to 160-180° F. and was diluted with 2,000 grams of a 10 per cent solution of trisodium phosphate in water. The mass was then diluted further with 1500 grams of distilled water and was precipitated into 10 gallons of water containing 1135 grams of sulfuric acid. The ester was thoroughly washed and dried. A polyvinyl phthalate containing 68 per cent phthalyl resulted.

Example II 48 pounds of methyl ethyl ketone, 27 pounds of pyridine, and 72 pounds of phthalic anhydride were mixed and warmed slightly. 15 pounds of polyvinyl alcohol were added, and the mass was stirred and heated with steam. Solution occurred in one-half hour. Heating and stirring were continued for 6 hours at 182° F. Mixture was diluted with a solution of 40 pounds of trisodium phosphate in 275 pounds of water. It was then precipitated by pouring with stirring into diluted hydrochloric acid, the acid being present in sufficient amount that the precipitating liquid remained acid during the entire precipitation. After thoroughly washing and drying 47 pounds of a polyvinyl phthalate containing 68.6% phthalyl was obtained.

Example III 48 pounds of methyl ethyl ketone, 27 pounds of pyridine, and 72 pounds of phthalic anhydride were mixed and warmed slightly. 15 pounds of hydrolyzed polyvinyl acetate (approximately 20 per cent polyvinyl acetate) were added. The mass was stirred and heated with steam. Solution occurred in one-half hour. Heat and stirring were continued for six hours at 18° F. The mixture was then diluted with 40 pounds of trisodium phosphate ($Na_3PO_4 \cdot 12H_2O$) in 275 pounds of water. The diluted mass was precipitated in diluted hydrochloric acid which was maintained acid throughout precipitation. After thoroughly washing and drying, a polyvinyl acetate phthalate was obtained containing 67.7% phthalyl.

Example IV

A mixture of 75 pounds of methyl ethyl ketone, 75 pounds of polyvinyl acetate, and 7½ pounds of distilled water were heated for one hour at 250° F. The mass was cooled and 75 pounds of phthalic anhydride was added. The mass was heated in a tumbling autoclave for seven hours at 290-300° F. The mass was cooled and diluted with 150 pounds of 10 per cent trisodium phosphate solution in water. The diluted mass was precipitated into water completely acid with diluted hydrochloric acid throughout the precipitation.

In precipitating the polyvinyl dicarboxylic acid ester in aqueous acid, the acid should be present in the precipitating bath in such amount that it remains acid throughout the precipitation. For instance, if an amount of sodium phosphate greater than necessary has been employed in the diluting step, more acid than necessary should be employed in the precipitating bath to compensate therefor. Our invention is directed generally to the preparation of polyvinyl dicarboxylic acid esters, all of the esterifications of this type being similar. Thus our invention includes not only the phthalates, but also the succinates maleates, fumarates and the like of polyvinyl compounds containing esterifiable hydroxyl groups.

We claim:

1. A method for the manufacture of polyvinyl acetate phthalate which comprises reacting polyvinyl acetate having free and esterifiable hydroxyl groups with phthalic anhydrides and pyridine, the pyridine being in an amount less than sufficient to combine with all of the carboxyls present after the esterification is completed, adding trisodium phosphate to the mass in an amount sufficient to neutralize the free carboxyl groups of the ester formed and subsequently separating the ester from the mass by mixing with a precipitating liquid essentially consisting of water and a mineral acid, the precipitating bath being maintained acid throughout the precipitation.

2. A method for the manufacture of polyvinyl phthalate which comprises reacting polyvinyl alcohol with phthalic anhydrides and pyridine, the pyridine being in an amount less than sufficient to combine with all of the carboxyls present after the esterification is completed, adding trisodium phosphate to the mass in an amount sufficient to neutralize the free carboxyl groups of the ester formed, and subsequently separating the ester from the mass by mixing with a precipitating liquid essentially consisting of water and a mineral acid, the precipitating bath being maintained acid throughout the precipitation.

3. A process for the manufacture of a polyvinyl dicarboxylic acid ester, which comprises reacting a polyvinyl compound containing free and esterifiable hydroxyl groups with a dicarboxylic acid anhydride and pyridine, the pyridine, being in an amount less than sufficient to combine with all of the carboxyls present adding trisodium phosphate to the completed reaction mass in an amount sufficient to neutralize the free carboxyl groups of the ester and subsequently separating the ester from the mass by mixing with a precipitating liquid essentially consisting of water and a mineral acid, the precipitating bath being maintained acid throughout the precipitation.

CARL J. MALM.
LA MOYNE D. BEARDEN.

REFERENCES CITED

The following references are of record in the file of this patent:

UNITED STATES PATENTS

| Number | Name | Date |
|---|---|---|
| 2,379,309 | Malm et al. | June 26, 1945 |